(12) United States Patent
Wilhelmsson et al.

(10) Patent No.: US 12,207,299 B2
(45) Date of Patent: Jan. 21, 2025

(54) METHODS, APPARATUS AND DEVICE-READABLE MEDIUMS FOR SCHEDULING TRANSMISSIONS IN A WIRELESS NETWORK

(71) Applicant: Telefonaktiebolaget LM Ericsson (publ), Stockholm (SE)

(72) Inventors: Leif Wilhelmsson, Lund (SE); Guido Roland Hiertz, Aachen (DE); Naveed Butt, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 627 days.

(21) Appl. No.: 17/421,081

(22) PCT Filed: Jan. 16, 2019

(86) PCT No.: PCT/EP2019/051056
§ 371 (c)(1),
(2) Date: Jul. 7, 2021

(87) PCT Pub. No.: WO2020/147947
PCT Pub. Date: Jul. 23, 2020

(65) Prior Publication Data
US 2022/0116991 A1    Apr. 14, 2022

(51) Int. Cl.
*H04W 74/0808* (2024.01)
*H04L 5/00* (2006.01)
*H04W 74/06* (2009.01)

(52) U.S. Cl.
CPC ....... *H04W 74/0808* (2013.01); *H04L 5/0053* (2013.01); *H04W 74/06* (2013.01)

(58) Field of Classification Search
CPC . H04W 84/12; H04W 16/14; H04W 74/0808; H04W 74/0816; H04W 72/541; H04W 74/0825; H04W 52/243; H04W 74/06
See application file for complete search history.

(56) References Cited

U.S. PATENT DOCUMENTS

| | | | |
|---|---|---|---|
| 2016/0014796 A1 | 1/2016 | Söder et al. | |
| 2016/0135142 A1* | 5/2016 | Lee | H04L 12/1877 370/329 |
| 2019/0215841 A1 | 7/2019 | Sugaya et al. | |

FOREIGN PATENT DOCUMENTS

| WO | 2016200303 A1 | 12/2016 |
|---|---|---|
| WO | 2018044353 A2 | 3/2018 |
| WO | 2018079025 A1 | 5/2018 |

* cited by examiner

*Primary Examiner* — Nam T Huynh
(74) *Attorney, Agent, or Firm* — COATS & BENNETT, PLLC

(57) ABSTRACT

One aspect of the disclosure provides a method performed by a transmitting device, for transmitting wirelessly to a receiving device in a wireless network. The method comprises: obtaining information which is indicative of a level of wireless activity caused by interfering transmissions by one or more interfering devices, experienced by one or more receiving devices on one or more first channels configured for transmissions by the one or more receiving devices; and determining whether to transmit to a receiving device of the one or more receiving devices using one or more second channels based on the information indicative of the level of wireless activity experienced by the one or more receiving devices on the one or more first channels.

28 Claims, 5 Drawing Sheets

METHODS, APPARATUS AND DEVICE-READABLE MEDIUMS FOR SCHEDULING TRANSMISSIONS IN A WIRELESS NETWORK

TECHNICAL FIELD

Embodiments of the disclosure relate to wireless networks, and particularly to methods, apparatus and device-readable mediums for scheduling transmissions in a wireless network.

BACKGROUND

There is an increased interest in using unlicensed bands for wireless communications, such as the 2.4 GHz ISM band and the 5 GHz bands. To ensure coexistence between different devices using a certain radio access technology (RAT) as well as between devices using different RATs, a co-existence mechanism needs to be employed. One commonly used co-existence mechanism is based on listen before talk (LBT), also implemented by carrier sense multiple access with collision avoidance (CSMA/CA). Effectively, a device that intends to make use of the wireless medium for transmission senses the channel and determines whether the channel is busy (in use or occupied) or idle (unoccupied). This determination may be based on measuring the power that is received on the channel and comparing this with a threshold. If the channel is determined to be busy, i.e., the received power is above the threshold, the transmission is deferred whereas if the channel is determined to be idle, i.e., the received power is below the threshold, a transmission is initiated. The goal is to avoid collisions (interference) between transmissions by different devices by only initiating a transmission when the channel is not already used.

The threshold value used in the LBT assessment should be set sufficiently low that a transmission is deferred if it would result in a collision with (i.e. cause unacceptable interference to) ongoing transmissions by other devices. However, the threshold value should also be set appropriately high such that a transmission is not deferred when it would do no harm to ongoing transmissions. In the 802.11 standards, the power threshold for when the channel is declared to be idle is −82 dBm when an 802.11 preamble is detected (so-called preamble detect clear-channel assessment) and −62 dBm when no 802.11 preamble is detected (so-called energy detect clear-channel assessment). This effectively means that when an 802.11 device senses the channel prior to a transmission, it is 20 dB more aggressive towards ongoing transmissions not having an 802.11 preamble.

It can be seen that if the threshold value is decreased, the probability of deferring from channel access is increased, whereas if the threshold value is increased, the probability of causing a collision is increased.

Even if the threshold value is selected with care, it has been found that a suitable threshold value is very situation dependent. In particular, it has been found that in many situations the channel can be accessed without causing any harm to other devices, especially if the transmission power is reduced. In IEEE 802.11ax, this fact is explored in what is referred to as OBSS_PD-based spatial reuse. If the used transmission power, TX_PWR, is reduced below a reference level, TX_PWR_ref, the threshold used for detecting a preamble from an overlapping basic service set (OBSS), here denoted OBSS_PD_level, may be increased. The increase in the OBSS_PD_level (defined in dB) is in fact the same as the decrease of the used transmission power until a maximum level for the OBSS_PD_level is reached.

The underlying idea is that a device sensing the channel can determine whether a transmission actually comes from the same BSS, in which case the device will defer from transmitting, or from an OBSS, in which case the device may initiate a transmission even if the received power is higher than the threshold, provided that the device uses a reduced transmission power. The OBSS_PD-level based approach for increased spatial reuse does not ensure that the transmission will not interfere with ongoing transmissions, however. Following this approach merely ensures that accessing the channel will not be worse than using the lowest threshold and the highest transmission power.

In 802.11ax, there is another approach for increasing spatial reuse, referred to as SRP-based spatial reuse. In this approach, a transmitting device estimates the highest possible transmission power that can be used without causing any noticeable degradation for other ongoing transmissions.

The SRP-based spatial reuse approach largely resembles the first (OBSS_PD-based spatial reuse) if one treats the maximum allowed transmission power in the SRP-based approach as the OBSS_PD threshold in the former. Specifically, a packet is prepared for transmission at a given transmission power, which potentially may be smaller than the maximum allowed transmission power. The transmitting device (STA) then receives a packet which indicates that spatial reuse transmission is allowed provided the transmission does not cause interference above a certain level at the device which will be receiving during the spatial reuse transmission and thus potentially suffer from interference. The STA calculates what the interference requirement implies in terms of allowed transmission power, and if the allowed transmission power is at least as large as that needed to successfully transmit the packet, an attempt to transmit the packet may be initiated.

SUMMARY

One problem with the approaches to spatial reuse set out above is that they consider only the ability of a transmitting device to transmit a packet, and the potential interfering effect of that transmission on ongoing transmissions by other devices. None of the approaches considers the ability of the receiving device to receive and successfully decode the packet, nor its ability to transmit an acknowledgement message in response to the received packet (as is required for a large number of traffic types), or other response message. However, if a receiving device is unable to receive and decode the transmitted packet transmitted packet because of interfering transmissions in the vicinity of the receiving device, nothing will have been gained and the transmitting device will have to perform a retransmission. Similarly, if a receiving device is unable to transmit an acknowledgement message or other response message owing to a listen-before-talk failure (and an acknowledgement or response is required), the transmitting device will have to perform a retransmission. In both cases, the goal of spatial reuse—additional throughput—is not achieved, while the potential for interference with other devices is increased.

Embodiments of the disclosure seek to address these and other problems.

In one aspect of the disclosure, there is provided a method performed by a transmitting device, for transmitting wirelessly to a receiving device in a wireless network. The method comprises: obtaining information which is indicative of a level of wireless activity caused by interfering transmissions by one or more interfering devices, experienced by one or more receiving devices on one or more first channels configured for transmissions by the one or more receiving devices; and determining whether to transmit to a receiving device of the one or more receiving devices using one or more second channels based on the information indicative of the level of wireless activity experienced by the one or more receiving devices on the one or more first channels.

Further aspects provide apparatus for performing the method set out above. For example, one aspect provides a transmitting device, for transmitting wirelessly to a receiving device in a wireless network. The transmitting device comprises processing circuitry and a non-transitory machine-readable medium storing instructions which, when executed by the processing circuitry, cause the transmitting device to: obtain information which is indicative of a level of wireless activity caused by interfering transmissions by one or more interfering devices, experienced by one or more receiving devices on one or more first channels configured for transmissions by the one or more receiving devices; and determine whether to transmit to a receiving device of the one or more receiving devices using one or more second channels based on the information indicative of the level of wireless activity experienced by the one or more receiving devices on the one or more first channels.

Another aspect of the disclosure provides a method performed by a receiving device, for scheduling transmissions by a transmitting device in a wireless network. The method comprises: obtaining information which is indicative of a level of wireless activity caused by interfering transmissions by one or more interfering devices, experienced by one or more transmitting devices on one or more first channels configured for transmissions by the one or more transmitting devices; and determining whether to transmit a polling or scheduling message to a transmitting device of the one or more transmitting devices, scheduling resources for the transmitting device in which to transmit one or more uplink messages, based on the information indicative of the level of wireless activity experienced by the one or more transmitting devices on the one or more first channels.

Further aspects provide apparatus for performing the method set out above. For example, one aspect provides a receiving device, for scheduling transmissions by a transmitting device in a wireless network. The receiving device comprises processing circuitry and a non-transitory machine-readable medium storing instructions which, when executed by the processing circuitry, cause the receiving device to: obtain information which is indicative of a level of wireless activity caused by interfering transmissions by one or more interfering devices, experienced by one or more transmitting devices on one or more first channels configured for transmissions by the one or more transmitting devices; and determine whether to transmit a polling or scheduling message to a transmitting device of the one or more transmitting devices, scheduling resources for the transmitting device in which to transmit one or more uplink messages, based on the information indicative of the level of wireless activity experienced by the one or more transmitting devices on the one or more first channels.

BRIEF DESCRIPTION OF THE DRAWINGS

For a better understanding of embodiments of the present disclosure, and to show more clearly how they may be carried into effect, reference will now be made, by way of example only, to the following drawings, in which.

DETAILED DESCRIPTION

Figure 1:
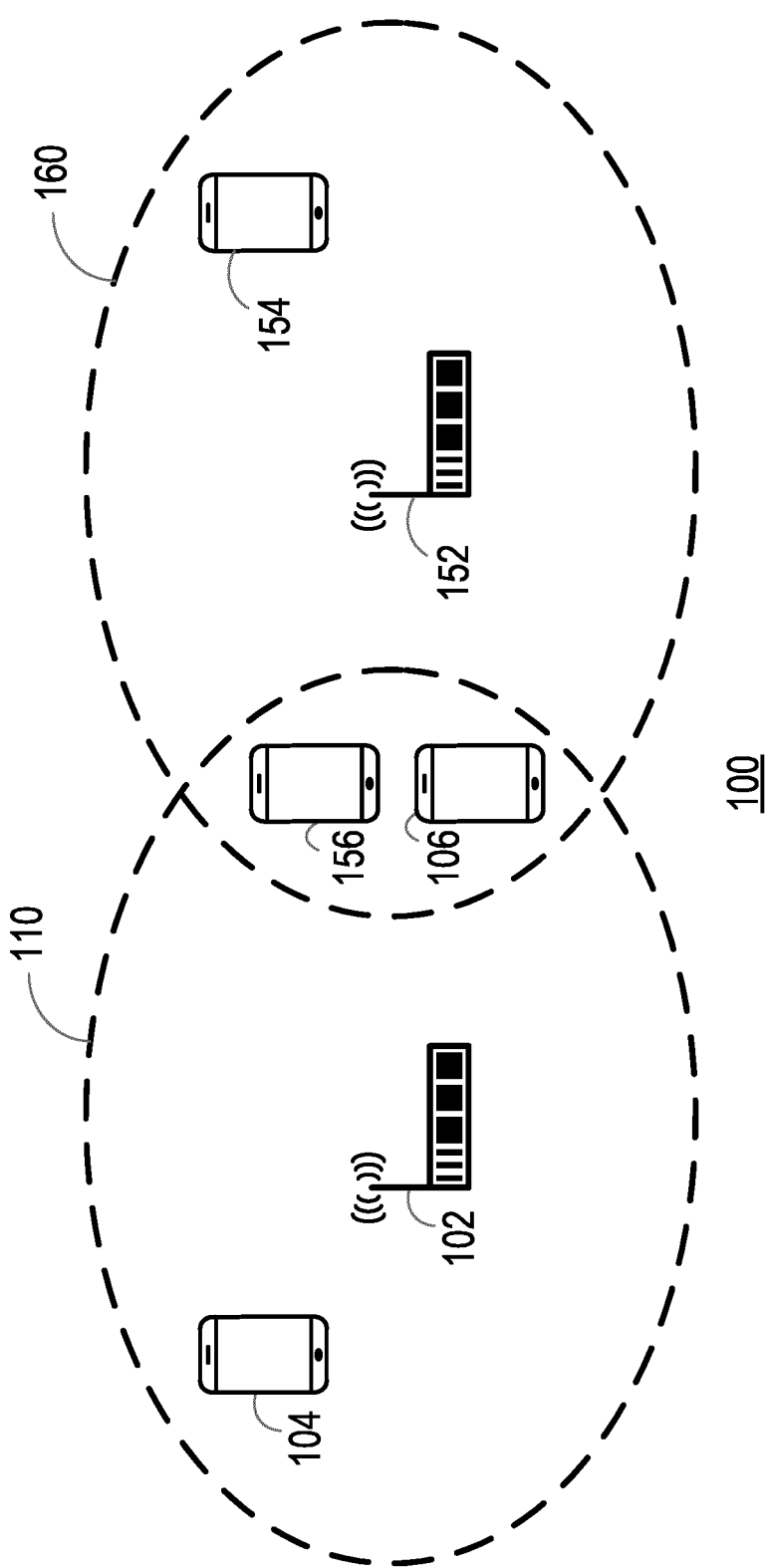
FIG. 1 shows a wireless communication network according to embodiments of the disclosure.

FIG. 1 shows a wireless communication network 100 according to embodiments of the disclosure. The network 100 comprises a first access point 102 and a second access point 152, each associated with respective first and second basic service sets (BSSs) or cells 110, 160. The network 100 further comprises first and second target wireless devices 104, 106, associated with the first BSS 110; and first and second interfering wireless devices 154, 156 associated with the second BSS 160. The second target device 106 and the second interfering wireless device 156 are located relatively close to each other, whereas the first target device 104 and first interfering wireless device 154 are located relatively far from each other. In the illustrated embodiment, it can be seen that transmissions from the first access point 102 to the first target wireless device 104 will be in a direction which is away from the second access point 152 and both interfering wireless devices 154, 156; conversely, transmissions from the first access point 102 to the second target wireless device 106 will be in a direction which is towards the second access point 152 and both interfering wireless devices 154, 156.

In the illustrated embodiment, the coverage areas of the first and second BSSs 110, 160 overlap with each other, and the second target and interfering wireless devices 106, 156 are located within the coverage areas of both BSSs 110, 160. Those skilled in the art will appreciate that in other embodiments the BSSs may not neighbor each other.

The access points 102, 152 and wireless devices 104, 106, 154, 156 transmit to each other using a radio-access technology that requires performing a carrier-sense assessment (e.g., a clear-channel assessment, CCA) prior to each transmission. For example, the radio-access technology may utilize unlicensed spectrum, which is shared between multiple radio-access technologies. In one embodiment, the network 100 implements the IEEE 802.11 standard (known as "Wi-Fi") and may implement one or more of its amendments and comprises a wireless local area network (WLAN). For convenience, the terminology used herein may correspond to that used in the 802.11 standard (e.g., "access point", "STA"). However, the concepts described herein may also find use in other radio-access technologies.

To achieve high spectrum efficiency for the network 100, it is desirable that the same frequency can be reused in cells that are relatively close or even adjacent to one another. This concept is sometimes known as "spatial reuse"—the same channel resources are reused in cells that are spatially close. One key component for achieving good spatial reuse is to explore the fact that the interference level in a cell is highly varying—both in time and spatially. That is to say, spatial reuse may sometimes be possible whereas in others it may not and in addition whether spatial reuse is possible may depend on which devices within a cell are involved in the transmissions and reception.

One scenario which may be described using the network 100 depicted in FIG. 1 is as follows. The first access point 102 has data to transmit to the second target device 106. Prior to performing a transmission, the first access point 102 must perform carrier-sensing (e.g., a clear-channel assessment, CCA) to detect whether there are ongoing transmissions by other wireless devices in the vicinity which would be adversely affected by any transmissions by the first access point 102. Thus, the first access point 102 listens to the wireless channel (e.g., a transmission frequency or range of transmission frequencies assigned to the first access point for transmissions) and compares the measured energy or power of known or unknown signals and waveforms to one or more thresholds.

An ongoing transmission is taking place in the second BSS 160, between the second access point 152 and the second interfering device 156. However, in a first case, let us assume that the carrier-sensing performed by the first access point 102 is positive, that is, the energy detected by the first access point 102 is below the one or more thresholds and thus the first access point 102 considers the wireless medium to be unoccupied and therefore transmits to the second target wireless device 106. The interference caused by the transmissions between the second access point 152 and the second interfering device 156—as measured at the first access point 102—is not sufficiently high to cause the transmission to be deferred.

However, the second target wireless device 106 is closer to the second access point 152 and the source of the interfering transmissions (whether they originate in the second access point 152 or the second interfering device 156). Thus the second target wireless device 106 experiences greater interference than the first access point 102, and may have difficulty in receiving and decoding any packet which is transmitted by the first access point 102. Additionally or alternatively, the second target wireless device 106 may be unable to transmit an acknowledgement (or other response) to the first access point 102 in response to any received packet, on account of carrier-sensing failure caused by the ongoing transmissions between the second access point 152 and the second interfering wireless device 156. Thus, although the first access point 102 is able to transmit a packet to the second target wireless device 106, the second target wireless device 106 may be unable to receive or acknowledge, or respond to the transmitted packet.

Embodiments of the present disclosure address these and other problems, by providing methods, apparatus and device-readable mediums in which a transmitting device takes into account the radio conditions experienced by a receiving device when determining whether to transmit to the receiving device. The radio conditions may be inferred by the transmitting device (e.g., based on known or inferred geographical locations of the receiving device and any interfering devices), or explicitly signaled to the transmitting device by the receiving device. Here it may be assumed that the devices in question have low or zero mobility, and thus their geographical locations remain relatively unchanged between transmissions. Further, if the transmitting device has data to transmit to multiple potential receiving devices, the transmitting device may select which of the multiple receiving devices to transmit to based on the radio conditions experienced by those receiving devices. For example, the transmitting device may select a receiving device which is experiencing relatively little interference, in preference to a receiving device which is experiencing relatively high interference.

Figure 2:
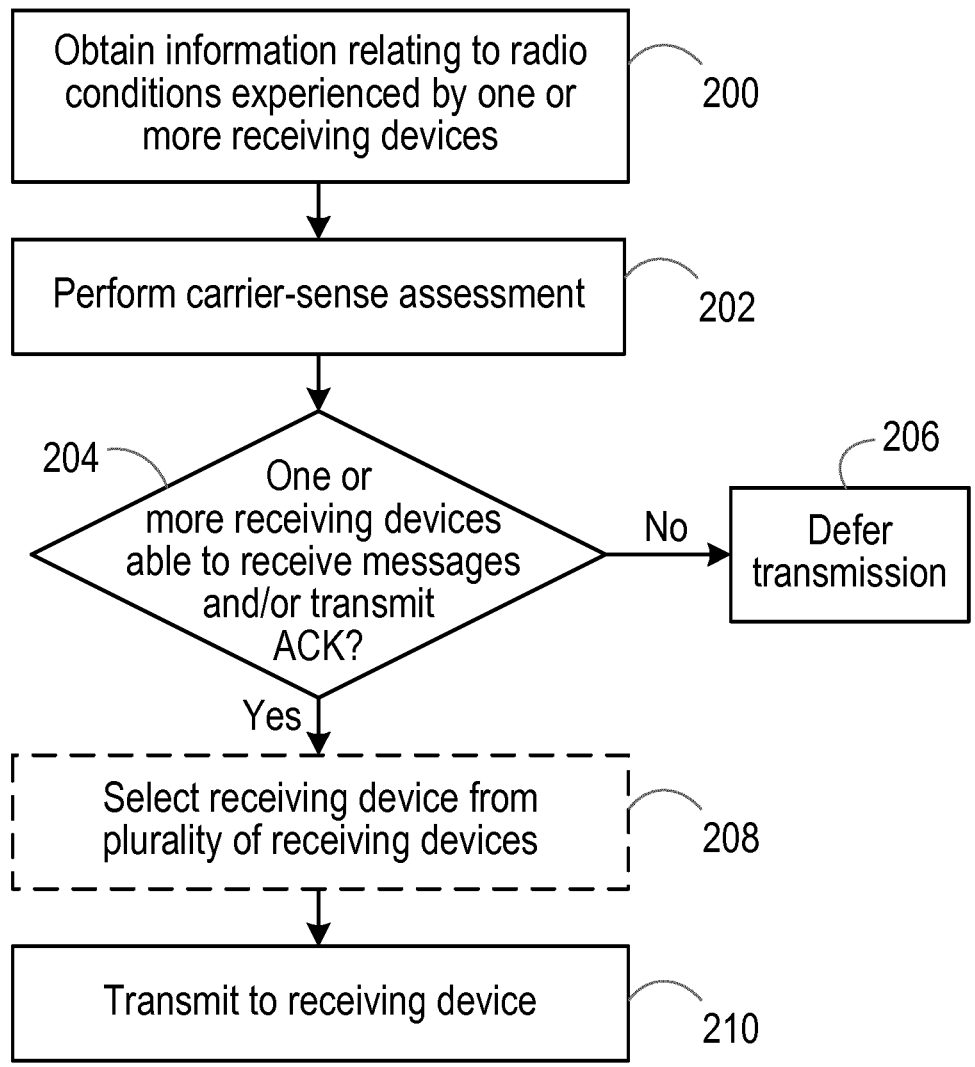
FIG. 2 is a flowchart of a method in a transmitting device according to embodiments of the disclosure.

These and other embodiments are discussed below with respect to FIG. 2, which is a flowchart of a method in a transmitting device according to embodiments of the disclosure. The transmitting device may be any suitable device, such as an access point (AP) or a mobile device, also referred to as a Station (STA). For example, the transmitting device may be the first access point 102 in the scenario described above with respect to FIG. 1. The transmitting device is configured with one or more channels (referred to in this embodiment as "second channels") over which wireless transmissions can take place from the transmitting device to the one or more receiving devices. The channel may correspond to a particular transmission frequency, or in practice a range of transmission frequency centered on a particular frequency. The receiving devices are configured with one or more channels (referred to in this embodiment as "first channels") over which transmissions may take place from the receiving devices to the transmission device. In many embodiments, the first and second channels may be the same, i.e. the transmission and receiving devices transmit to each other using the same channel or channels.

The method begins in step 200, in which the transmitting device obtains information which is indicative of the radio conditions experienced by one or more receiving devices on one or more first channels configured for transmissions by the one or more receiving devices. For example, the transmitting device may obtain information which is indicative of a level of wireless activity caused by interfering transmissions by one or more interfering devices, as experienced by the one or more receiving devices.

In one embodiment, the information is obtained directly from the one or more receiving devices themselves. That is, the one or more receiving devices may transmit to the transmitting device an indication of the interference which is experienced by the respective receiving device or which the respective device expects to experience. In the latter case, the prediction of an expected interference may be based on past measurements, statistical evaluations or other information collected by the device. The interference information may be provided through the one or more first channels, on different radio channels, piggybacked to other information, or via an independent communication channel. The receiving device(s) may transmit such information periodically, or on an event-driven basis. In the latter case, the transmitting device may request interference information from the receiving device(s) in a wireless request message, with the information being provided in response to that request.

Alternatively or additionally, the information may be obtained by the transmitting device based on its own measurements. In such embodiments the transmitting device performs measurements to detect a level of wireless activity on the one or more first channels. Such measurements may be performed periodically, or on an event-driven basis. In the latter case, for example, the measurements may be performed as part of carrier-sensing (see step 202, discussed below) prior to performing a transmission to the one or more receiving devices.

The information may relate to a geographical location of the one or more interfering devices. The geographical location may be approximate, or comprise only partial information. For example, the geographical location may comprise a direction between the transmitting device and the interfering device(s), e.g., as measured using angle-of-arrival techniques, but not the distance. Alternatively, the distance may additionally be determined or inferred by measuring the received signal strength and calculating a pathloss.

For example, the information may comprise an identifier of the BSS (e.g., BSS 160) with which the interfering devices are associated. The identity may be a unique identity for the particular BSS, or an identifier which may be considered unique for the BSS by the transmitting device. In the latter case, such an identifier may comprise the color of the BSS, which is defined in 802.11ax as a six-bit field within the transmission and thus takes one of 64 possible values.

The location of nearby BSSs and their identifiers may be pre-programmed in the transmitting device on set-up of the transmitting device (e.g., on set-up of the first access point 102). In that case, the transmitting device may determine the geographical location of the one or more interfering devices based on the obtained identifier for the BSS and the pre-programmed location associated with that identifier.

Alternatively or additionally, the location of nearby BSSs or interfering devices may be detected or inferred based on an angle of arrival of the transmission, at the transmitting device (in embodiments where the transmitting device performs its own measurements to obtain the information) or the receiving device (in embodiments where the receiving devices perform measurements and report to the transmitting device). In such embodiments, the direction of arrival of an interfering transmission may be determined with a receiver having multiple antenna elements and using known techniques for example related to beamforming (e.g., measuring the difference in time of arrival at each of the antenna elements).

In further embodiments of the disclosure, the information obtained in step 200 may relate to a geographical location of one or more devices which are to receive the interfering transmissions. In such embodiments, an identity of a receiving device for the interfering transmission may be determined by decoding, at least partially, an interfering transmission (either at the transmitting device or one or more receiving devices, as discussed above) and reading an identifier from the interfering transmission. For example, one suitable identifier may be a media access control (MAC) address for the intended receiver in the interfering transmission. A location of the receiving device for the interfering transmission may then be determined by waiting for that device to transmit an acknowledgement message in response to the interfering transmission and measuring an angle of arrival of the transmitted acknowledgement message. If no acknowledgement message is detected in response to the interfering transmission, it may be concluded that the receiving device for the interfering transmission is far away (and therefore not near enough to cause interference to the transmitting device or to be affected by transmissions by the transmitting device).

Thus, the transmitting device obtains information relating to radio conditions experienced by one or more receiving devices. In one embodiment, for example where the transmitting device is a mobile station, the transmitting device may obtain information in respect of only one receiving device (e.g., an access point). In an alternative embodiment, for example where the transmitting device is an access point, the transmitting device may obtain information in respect of multiple receiving devices (e.g., the multiple mobile stations associated with or belonging to the BSS or cell of the access point).

The transmitting device also has knowledge of the locations of the one or more receiving devices (e.g., through previous packet or frame exchanges between the transmitting device and the one or more receiving devices, use of beamforming techniques, etc). Thus, the transmitting device may establish, over time, information which is indicative of the radio conditions experienced by those one or more receiving devices. The radio conditions may be inferred by the transmitting device (e.g., based on detected interfering transmissions, and knowledge of a geographical location of the interfering devices and/or interfering receiving devices) or explicitly reported to the transmitting device by the one or more receiving devices themselves.

In step 202, for example upon determining that it has data to transmit to at least one of the one or more receiving devices, the transmitting device performs carrier-sensing to detect a level of wireless activity on one or more second channels configured for transmissions by the transmitting device. The carrier-sensing may correspond to an energy-detect or a preamble-detect clear-channel assessment, for example.

In one embodiment, if the carrier-sensing is negative (i.e., the wireless activity detected on the one or more second channels is above the threshold, or the second channels are occupied), the transmitting device defers transmission. If the carrier-sensing is positive (i.e., the wireless activity on the one or more second channels is below the threshold, or the second channels are unoccupied) the method proceeds to step 204 (discussed below), and consideration of the radio conditions experienced by the one or more receiving devices.

In alternative embodiments, the method may proceed to step 204 regardless of whether the carrier-sensing in step 202 is positive or negative. In such embodiments, the transmitting device proceeds to determine whether a receiving device is likely to be able to decode a transmitted packet, or to transmit an acknowledgement or response message, in deciding whether to transmit the packet to the receiving device at all.

In step 204, the transmitting device determines whether one or more of the receiving devices are able to receive messages transmitted to them by the transmitting device (e.g., based on the interference at the receiving device being below a threshold or being not too high). If the data packet to be transmitted to the receiving devices requires acknowledgement (e.g., through transmission of an ACK/NACK message) or other response, step 204 may additionally or alternatively comprise determining whether one or more of the receiving devices is not prevented from transmitting an acknowledgement message or response message in response to a received packet (e.g., interference at the receiving device is not so high that carrier-sensing performed by the receiving device in respect of an acknowledgement or response message is likely to fail).

Those skilled in the art will appreciate that the 802.11 specification recites that carrier-sensing by the receiving device occurs under certain conditions. For example, a DATA frame may be acknowledged unconditionally, i.e., without performing carrier-sensing (or regardless of the state of the wireless medium). During a transmit opportunity (TXOP) the same principle applies. Once a TXOP has been initiated, all following packets are unconditionally acknowledged without carrier-sensing. However, to initiate a TXOP a protective frame setup (e.g. request to send/clear to send or DATA/ACK) is required. This setup triggers the network allocation vector (NAV) at nearby stations. With 802.11ax uplink (UL) orthogonal frequency division multiple access (OFDMA), carrier-sensing may be optional if the UL transmission duration is less than 584 µs. In this case, the access point decides whether UL STAs must apply carrier-sensing (or "CS required bit"). Consequently, there are various cases in 802.11 when a receiving STA does not apply carrier-sense for ACK generation (or when it does not honor the state of the wireless medium). However, embodiments of the present disclosure may nonetheless apply to the transmission of response messages other than acknowledgement messages, such as messages confirming that a particular instructed action has taken been performed, for example.

The determination in step 204 is based on the information obtained in step 200. For example, based on the information obtained in step 200, the transmitting device may be able to determine whether a receiving device is particularly close to an interfering device (i.e. a device which is a source of an interfering transmission as measured at the receiving device), or a receiving device for an interfering transmission interfering. In either case, the radio conditions as measured at the receiving device are likely to be poor (e.g., the receiving device may be unable to receive or decode any packet which is transmitted to it, and/or to transmit an acknowledgement or response message).

In the illustrated embodiment, if the determination in step 204 is negative, i.e., none of the receiving devices is able to receive a transmitted packet and/or to transmit an acknowledgement or response message, the method proceeds to step 206 in which transmission of a packet to each of the one or more receiving devices is deferred.

If the determination in step 204 is positive, the method proceeds to an optional step 208, in which the transmitting device selects a receiving device from multiple potential receiving devices to transmit to. Thus step 208 may be performed if the transmitting device has data for multiple receiving devices (e.g. multiple STAs). In alternative embodiments, the transmitting device may attempt a transmission to a receiving device as long as the carrier-sensing performed in step 202 is positive. In such a case, the transmitting device may select a receiving device from multiple possible devices based on the information obtained in step 200. Thus the method proceeds directly from step 202 to step 208 in such embodiments.

For example, based on the information obtained in step 200, the transmitting device may select a first receiving device of the multiple receiving devices which is experiencing relatively less interference than other receiving devices of the multiple receiving devices. The transmitting device may determine whether each receiving device is particularly close to an interfering device (i.e. a device which is a source of an interfering transmission as measured at the receiving device), or a receiving device for an interfering transmission. In either case, the radio conditions at the receiving device are likely to be poor (e.g., the receiving device may be unable to receive or decode any packet which is transmitted to it, and/or to transmit an acknowledgement or response message). If a receiving device is not near to an interfering device or an interfering receiving device, it is likely to be experiencing relatively good radio conditions. The latter device may be selected in preference to the former device in step 208.

In step 210, the transmitting device transmits a packet to the receiving device (in embodiments where there is a single receiving device) or the receiving devices selected in step 208 (in embodiments where there are multiple receiving devices). The transmission may utilize beamforming techniques to direct the transmitted packet to the receiving device, such that interfering devices in other directions are less affected by the transmission.

Thus, embodiments of the present disclosure provide methods in which the radio conditions experienced by a receiving device are used in determining whether to transmit to that receiving device. When a transmitting device has data to transmit to multiple receiving devices, the transmitting device may select which device of the multiple receiving devices to transmit to, based on the radio conditions experienced by those receiving devices.

Those skilled in the art will know that IEEE 802.11ax introduced the concept of multi-user uplink transmissions, in which a receiving device (e.g., an access point) is able to schedule transmissions by one or more transmitting devices (e.g., mobile stations). Thus embodiments of the disclosure also provide corresponding methods, apparatus and device-readable mediums in which a receiving device takes into account the radio conditions experienced by a transmitting device when determining whether to schedule the transmitting device with radio resources for it to use in a transmission (e.g., through transmitting a polling message to the transmitting device in case it is not known whether the device actually has data to send or by sending a transmission grant in case it is known that the device has data to send).

Figure 3:
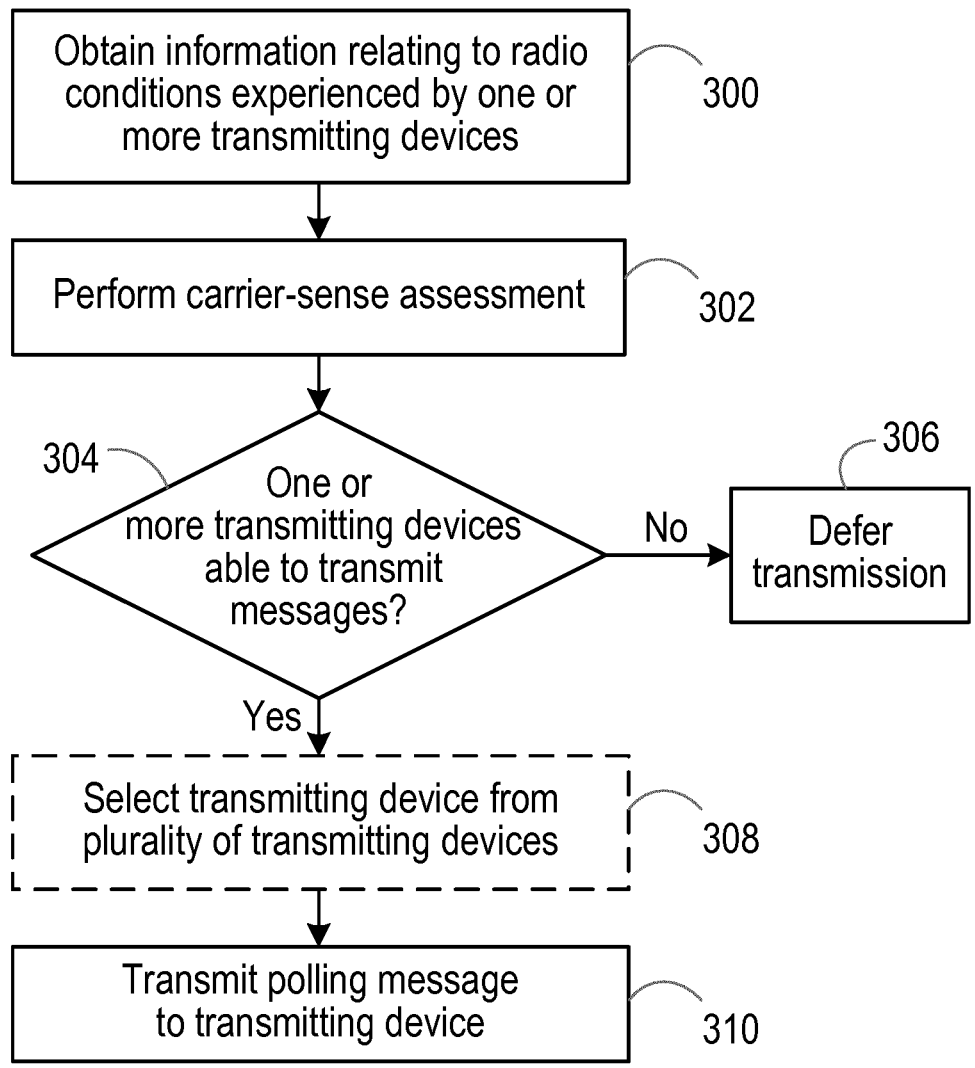
FIG. 3 is a flowchart of a method in a receiving device according to further embodiments of the disclosure.

FIG. 3 is a flowchart of a method in a receiving device according to embodiments of the disclosure. The receiving device may be any suitable device, such as an access point or a mobile device (STA). For example, the receiving device may be the first access point 102 described above with respect to FIG. 1.

Many of the steps of the method are similar to those described above with respect to FIG. 2. Thus, the method begins in step 300, in which the receiving device obtains information which is indicative of the radio conditions experienced by one or more transmitting devices on one or more first channels configured for transmissions by the one or more receiving devices. For example, the receiving device may obtain information which is indicative of a level of wireless activity caused by interfering transmissions by one or more interfering devices, as experienced by the one or more transmitting devices. Step 300 is substantially similar to step 200, described above, with the exception that it is performed by the receiving device (rather than the transmitting device), and that the determined radio conditions are experienced by the transmitting devices (rather than the receiving devices). The reader is directed to the corresponding passages above for a full description of this step.

In step 302, the receiving device performs carrier-sensing to measure a level of wireless activity on one or more channels configured for transmissions by the receiving device.

In step 304, the receiving device determines whether one or more of the transmitting devices are not prevented from transmitting a message to the receiving device (e.g., interference at the receiving device is not so high that carrier-sensing performed by the transmitting device is likely to fail).

The determination in step 304 is based on the information obtained in step 300. For example, based on the information obtained in step 300, the receiving device may be able to determine whether a transmitting device is particularly close to an interfering device (i.e. a device which is a source of an interfering transmission as measured at the receiving device), or a receiving device for an interfering transmission. In either case, the radio conditions at the transmitting device are likely to be poor (e.g., the transmitting device is likely to experience a listen-before-talk failure).

In the illustrated embodiment, if the determination in step 304 is negative, i.e., none of the transmitting devices is determined to be able to transmit a message, the method proceeds to step 306 in which transmission of a polling message to each of the one or more transmitting devices is deferred.

If the determination in step 304 is positive, the method proceeds to an optional step 308, in which the receiving device selects a transmitting device from multiple potential transmitting devices to schedule and what resources to allocate to the respective transmitting device. Thus step 308 may be performed if multiple transmitting devices have data to transmit to the receiving device. In alternative embodiments, the receiving device may schedule a transmitting device with resources as long as the carrier-sensing performed in step 302 is positive. In such a case, the receiving device may select a transmitting device from multiple possible devices based on the information obtained in step 300. Thus the method proceeds directly from step 302 to step 308 in such embodiments.

For example, based on the information obtained in step 300, the receiving device may select a first transmitting device of the multiple transmitting devices which is experiencing relatively less interference than other transmitting devices of the multiple transmitting devices. The receiving device may determine whether each transmitting device is particularly close to an interfering device (i.e. a device which is a source of an interfering transmission as measured at the transmitting device), or a receiving device for an interfering transmission. In either case, the radio conditions at the transmitting device are likely to be poor (e.g., the transmitting device may be unable to transmit a message owing to listen-before-talk failure). If a transmitting receiving device is not near to an interfering device or an interfering receiving device, it is likely to be experiencing relatively good radio conditions. The latter device may be selected in preference to the former device in step 308.

In step 310, the receiving device transmits a polling or scheduling or trigger message scheduling the transmitting device (in embodiments where there is a single transmitting device) or the transmitting device selected in step 308 (in embodiments where there are multiple transmitting devices) with radio resources to transmit to the receiving device. The radio resources may comprise time and/or frequency resources.

Thus, embodiments of the disclosure provide methods in which spatial resources are re-used, making the usage of transmission resources more efficient and reducing the likelihood that a transmitting device will be subject to delays through carrier-sense failures.

Figure 4:
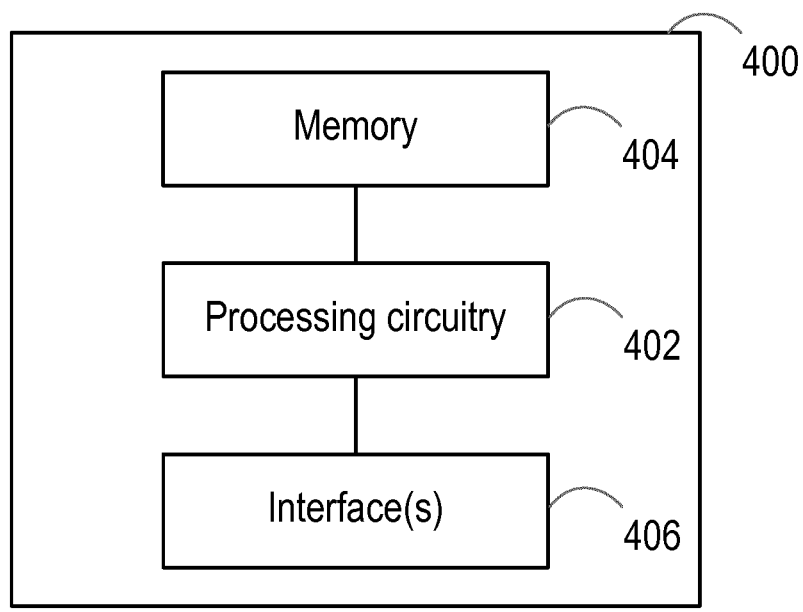
FIGS. 4 and 5 are schematic diagrams of transmitting devices according to embodiments of the disclosure.

FIG. 4 is a schematic diagram of a transmitting device 400 according to embodiments of the disclosure. The transmitting device 400 is operative to communicate in a wireless communications network, such a wireless local area network compliant with IEEE 802.11 specifications. The transmitting device 400 may be a wireless device such as a mobile station or user equipment, or a network node such as an access point or a base station. The transmitting device 400 may be configured to implement or perform the method described above with respect to FIG. 2.

The transmitting device 400 comprises processing circuitry 402, a non-transitory device-readable medium (such as memory) 404 and one or more interfaces 406. According to embodiments of the disclosure, the processing circuitry 402 is configured to obtain information which is indicative of a level of wireless activity caused by interfering transmissions by one or more interfering devices, experienced by one or more receiving devices on one or more first channels configured for transmissions by the one or more receiving devices. The processing circuitry 402 is further configured to determine whether to transmit to a receiving device of the one or more receiving devices using the one or more second channels based on the information indicative of the level of wireless activity experienced by the one or more receiving devices on the one or more first channels.

Figure 5:
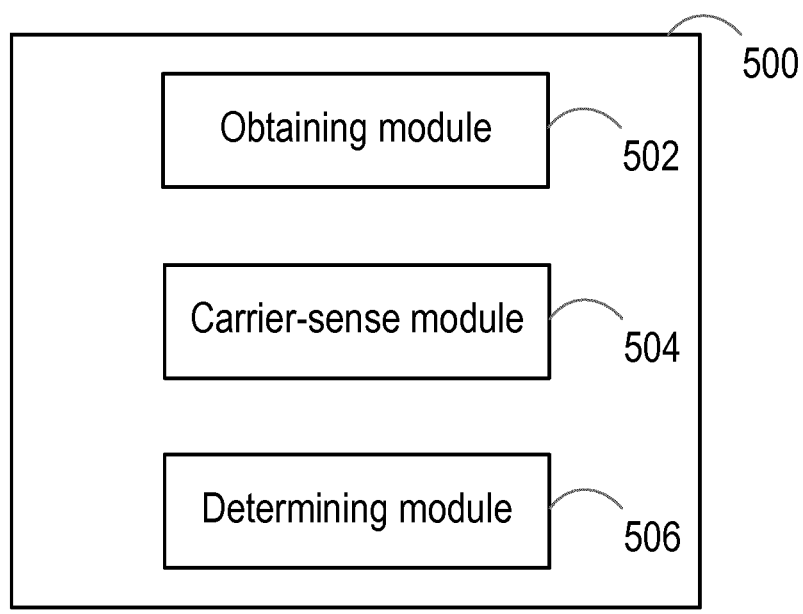

FIG. 5 is a schematic diagram of a transmitting device 500 according to further embodiments of the disclosure. The transmitting device 500 is operative to communicate in a wireless communications network requiring a carrier-sense mechanism, such a wireless local area network compliant with IEEE 802.11 specifications. The transmitting device 500 may be a wireless device such as a mobile station or user equipment, or a network node such as an access point or a base station. The transmitting device 500 may be configured to implement or perform the method described above with respect to FIG. 2.

The transmitting device 500 comprises an obtaining module 502, and a determining module 506. According to embodiments of the disclosure, the obtaining module 502 is configured to obtain information which is indicative of a level of wireless activity caused by interfering transmissions by one or more interfering devices, experienced by one or more receiving devices on one or more first channels configured for transmissions by the one or more receiving devices. The determining module 506 is configured to determine whether to transmit to a receiving device of the one or more receiving devices using the one or more second channels based on the information indicative of the level of wireless activity experienced by the one or more receiving devices on the one or more first channels. In the illustrated embodiment, the transmitting device further comprises a carrier-sense module 504 configured to perform carrier-sensing to detect a level of wireless activity on one or more second channels configured for transmissions by the transmitting device. In such an embodiment, the determining module 506 is additionally configured to determine whether to transmit to a receiving device based on an outcome of the carrier-sensing.

Figure 6:
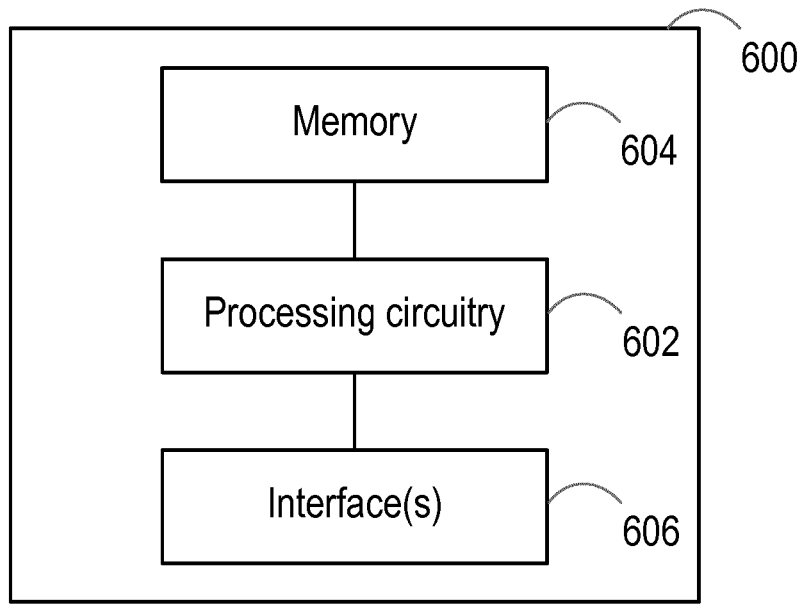
FIGS. 6 and 7 are schematic diagrams of receiving devices according to embodiments of the disclosure.

FIG. 6 is a schematic diagram of a receiving device 600 according to embodiments of the disclosure. The receiving device 600 is operative to communicate in a wireless communications network, such a wireless local area network compliant with IEEE 802.11 specifications. The receiving device 600 may be a wireless device such as a mobile station or user equipment, or a network node such as an access point or a base station. The receiving device 600 may be configured to implement or perform the method described above with respect to FIG. 3.

The receiving device 600 comprises processing circuitry 602, a non-transitory device-readable medium (such as memory) 604 and one or more interfaces 606. According to embodiments of the disclosure, the processing circuitry 602 is configured to obtain information which is indicative of a level of wireless activity caused by interfering transmissions by one or more interfering devices, experienced by one or more transmitting devices on one or more first channels configured for transmissions by the one or more transmitting devices. The processing circuitry 602 is further configured to determine whether to transmit a polling or scheduling message to a transmitting device of the one or more transmitting devices, scheduling resources for the transmitting device in which to transmit one or more uplink messages, based on the information indicative of the level of wireless activity experienced by the one or more transmitting devices on the one or more first channels.

Figure 7:
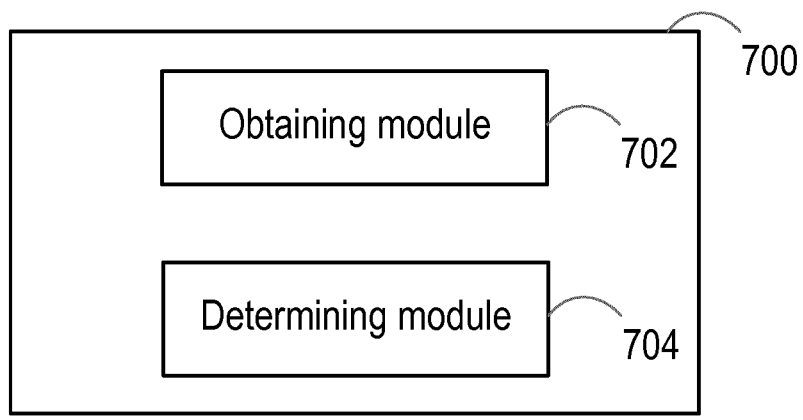

FIG. 7 is a schematic diagram of a receiving device 700 according to further embodiments of the disclosure. The receiving device 700 is operative to communicate in a wireless communications network requiring a carrier-sense mechanism, such a wireless local area network compliant with IEEE 802.11 specifications. The receiving device 700 may be a wireless device such as a mobile station or user equipment, or a network node such as an access point or a base station. The receiving device 700 may be configured to implement or perform the method described above with respect to FIG. 3.

The receiving device 700 comprises an obtaining module 702 and a determining module 704. According to embodiments of the disclosure, the obtaining module 702 is configured to obtain information which is indicative of a level of wireless activity caused by interfering transmissions by one or more interfering devices, experienced by one or more transmitting devices on one or more first channels configured for transmissions by the one or more transmitting devices. The determining module 704 is configured to determine whether to transmit a polling or scheduling message to a transmitting device of the one or more transmitting devices, scheduling resources for the transmitting device in which to transmit one or more uplink messages, based on the information indicative of the level of wireless activity experienced by the one or more transmitting devices on the one or more first channels.

In both embodiments described above with respect to FIGS. 4 and 6, the processing circuitry 402, 602 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other components, such as device readable medium 404, 604, the transmitting device 400 and the receiving device 600 with functionality. For example, processing circuitry 402, 602 may execute instructions stored in device readable medium 404, 604 or in memory within processing circuitry 402, 602. In some embodiments, processing circuitry 402, 602 may include a system on a chip (SOC). In some embodiments, processing circuitry 402, 602 may include radio frequency (RF) transceiver circuitry and baseband processing circuitry.

In certain embodiments, some or all of the functionality described herein as being provided by a transmitting device may be performed by processing circuitry 402, 602 executing instructions stored on device readable medium 404, 604 or memory within processing circuitry 402, 602. alternative embodiments, some or all of the functionality may be provided by processing circuitry 402, 602 without executing instructions stored on a separate or discrete device readable medium, such as in a hard-wired manner. In any of those embodiments, whether executing instructions stored on a device readable storage medium or not, processing circuitry 402, 602 can be configured to perform the described functionality. The benefits provided by such functionality are not limited to processing circuitry 402, 602 alone or to other components of the transmitting device 400, but are enjoyed by the transmitting device 400 or the receiving device 600 as a whole, and/or by end users and the wireless network generally.

Device readable medium 404, 604 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 402, 602. Device readable medium 404, 604 may store any suitable instructions, data or information, including a computer program, software, an application including one or more of logic, rules, code, tables, etc. and/or other instructions capable of being executed by processing circuitry 402, 602 and utilized by the transmitting device 400 or the receiving device 600. Device readable medium 404, 604 may be used to store any calculations made by processing circuitry 502, 602 and/or any data received via interface 406, 606. In some embodiments, processing circuitry 502, 602 and device readable medium 404, 604 may be considered to be integrated.

Interface(s) 406, 606 are used in the wireless communication of signalling and/or data between the transmitting device 400 and a receiving device, and between the receiving device 600 and a transmitting device. Interface(s) 406, 606 may include radio front end circuitry that may be coupled to, or in certain embodiments a part of, a plurality of antenna elements. The radio front end circuitry may be configured to condition signals communicated between the antenna elements and processing circuitry 402, 602. The radio front end circuitry may receive digital data that is to be sent to a receiving device via a wireless connection. The radio front end circuitry may convert the digital data into a radio signal having the appropriate channel and bandwidth parameters using a combination of filters and/or amplifiers. The radio signal may then be transmitted via the antenna elements. Similarly, when receiving data, the antenna elements may collect radio signals which are then converted into digital data by the radio front end circuitry. The digital data may be passed to processing circuitry 402, 602. In other embodiments, the interface may comprise different components and/or different combinations of components.

It should be noted that the above-mentioned embodiments illustrate rather than limit the concepts disclosed herein, and that those skilled in the art will be able to design many alternative embodiments without departing from the scope of the appended following claims. The word "comprising" does not exclude the presence of elements or steps other than those listed in a statement, "a" or "an" does not exclude a plurality, and a single processor or other unit may fulfil the functions of several units recited in the statements. Any reference signs in the claims shall not be construed so as to limit their scope.

The invention claimed is:

1. A method, performed by a transmitting device, for transmitting wirelessly to a receiving device in a wireless network, the method comprising the transmitting device:
   obtaining information which is indicative of a level of wireless activity caused by interfering transmissions by one or more interfering devices, experienced by one or more receiving devices on one or more first channels configured for transmissions by the one or more receiving devices;
   determining, based on the information indicative of the level of wireless activity experienced by the one or more receiving devices on the one or more first channels, whether the one or more receiving devices will be prevented from transmitting an acknowledgement or response message in response to a transmission by the transmitting device; and
   determining whether to transmit to a receiving device of the one or more receiving devices using one or more second channels based on the determination whether the receiving device will be prevented from transmitting the acknowledgement or response message.

2. The method of claim 1:
further comprising performing carrier-sensing to detect a level of wireless activity on one or more second channels configured for transmissions by the transmitting device;
wherein the transmitting device additionally determines whether to transmit to a receiving device of the one or more receiving devices based on an outcome of the carrier-sensing.

3. The method of claim 2:
wherein the performing carrier-sensing comprises detecting further interfering transmissions by one or more further interfering devices on the one or more second channels;
wherein the method further comprises obtaining information which is indicative of a geographical location of the one or more further interfering devices;
wherein the determination whether to transmit to a receiving device is based on the geographical location of the one or more further interfering devices.

4. The method of claim 1, wherein determining whether the one or more receiving devices will be prevented from transmitting an acknowledgement or response comprises determining, based on the information indicative of the level of wireless activity experienced by the one or more receiving devices on the one or more first channels, whether the one or more receiving devices will be prevented from transmitting an acknowledgement or response message in response to a transmission by the transmitting device owing to a carrier-sense failure at the one or more receiving devices.

5. The method of claim 1:
wherein the one or more receiving devices comprise a plurality of receiving devices; and
wherein the determining whether to transmit to a receiving device comprises determining which of the plurality of receiving devices to transmit to.

6. The method of claim 1, wherein the obtaining information comprises detecting the interfering transmissions, and obtaining the information from the one or more detected interfering transmissions.

7. The method of claim 1, wherein the obtaining information comprises receiving the information in one or more wireless messages transmitted by the one or more receiving devices.

8. The method of claim 1, wherein the information comprises an indication of the geographical location of the one or more interfering devices.

9. The method of claim 8, wherein the indication of the geographical location of the one or more interfering devices comprises an angle of arrival at the transmitting device or the receiving device of the interfering transmission by the one or more interfering devices.

10. The method of claim 8, wherein the indication of the geographical location of the one or more interfering devices comprises an identifier associated with a basic service set to which the interfering device belongs.

11. The method of claim 1, wherein the information comprises an indication of the geographical location of one or more interfering receiving devices, to which the one or more interfering transmissions are directed.

12. The method of claim 11, wherein the indication of the geographical location comprises an identity of the one or more interfering receiving devices obtained by decoding the one or more interfering transmissions.

13. A method, performed by a receiving device, for scheduling transmissions by a transmitting device in a wireless network, the method comprising the receiving device:
obtaining information which is indicative of a level of wireless activity caused by interfering transmissions by one or more interfering devices, wherein the interfering transmissions are experienced by one or more transmitting devices comprising the transmitting device, on one or more first channels configured for transmissions by the one or more transmitting devices;
determining, based on the information indicative of the level of wireless activity experienced by the one or more transmitting devices on the one or more first channels, whether the transmitting device will be prevented from transmitting one or more uplink messages to the receiving device; and
based on the determination whether the transmitting device will be prevented from transmitting the one or more uplink messages, determining whether to transmit a polling or scheduling message to the transmitting device, wherein the polling or scheduling message schedules resources in which to transmit one or more uplink messages from the transmitting device.

14. The method of claim 13:
further comprising performing carrier-sensing to detect a level of wireless activity on one or more second channels configured for transmissions by the receiving device;
wherein determining whether to transmit a polling or scheduling message to a transmitting device of the one or more transmitting devices is further based on an outcome of the carrier-sensing.

15. The method of claim 13:
wherein the one or more transmitting devices comprise a plurality of transmitting devices;
wherein the determining whether to transmit a polling or scheduling message to a transmitting device comprises determining which of the plurality of transmitting devices to transmit a polling or scheduling message to.

16. The method of claim 13, wherein the obtaining information comprises detecting the interfering transmissions, and obtaining the information from the one or more detected interfering transmissions.

17. The method of claim 13, wherein the obtaining information comprises receiving the information in one or more wireless messages transmitted by the one or more transmitting devices.

18. The method of claim 13, wherein the information comprises an indication of the geographical location of the one or more interfering devices.

19. The method of claim 13, wherein the information comprises an indication of the geographical location of one or more interfering receiving devices, to which the one or more interfering transmissions are directed.

20. The method of claim 13 wherein the determining whether the one or more transmitting devices will be prevented from transmitting comprises determining the one or more transmitting devices will be prevented from transmitting one or more uplink messages to the receiving device owing to a carrier-sense failure.

21. A transmitting device, for transmitting wirelessly to a receiving device in a wireless network, the transmitting device comprising:
processing circuitry;
memory containing instructions executable by the processing circuitry whereby the transmitting device is operative to:
obtain information which is indicative of a level of wireless activity caused by interfering transmissions by one or more interfering devices, experienced by one or more receiving devices on one or more first channels configured for transmissions by the one or more receiving devices;
determine, based on the information indicative of the level of wireless activity experienced by the one or more receiving devices on the one or more first channels, whether the one or more receiving devices will be prevented from transmitting an acknowledgement or response message in response to a transmission by the transmitting device; and
determine whether to transmit to a receiving device of the one or more receiving devices using one or more second channels based on the determination whether the receiving device will be prevented from transmitting the acknowledgement or response message.

22. The transmitting device of claim 21, wherein the instructions are such that the transmitting device is operative to:
perform carrier-sensing to detect a level of wireless activity on one or more second channels configured for transmissions by the transmitting device,
wherein the transmitting device is caused to additionally determine whether to transmit to a receiving device of the one or more receiving devices based on an outcome of the carrier-sensing.

23. The transmitting device of claim 22:
wherein performing carrier-sensing comprises detecting further interfering transmissions by one or more further interfering devices on the one or more second channels; and
wherein the instructions are such that the transmitting device is operative to:
obtain information which is indicative of a geographical location of the one or more further interfering devices; and
wherein the determination whether to transmit to a receiving device is based on the geographical location of the one or more further interfering devices.

24. A receiving device, for scheduling transmissions by a transmitting device in a wireless network, the receiving device comprising:
processing circuitry;
memory containing instructions executable by the processing circuitry whereby the receiving device is operative to:
obtain information which is indicative of a level of wireless activity caused by interfering transmissions by one or more interfering devices, wherein the interfering transmissions are experienced by one or more transmitting devices comprising the transmitting device, on one or more first channels configured for transmissions by the one or more transmitting devices;
determine, based on the information indicative of the level of wireless activity experienced by the one or more transmitting devices on the one or more first channels, whether the transmitting device will be prevented from transmitting one or more uplink messages to the receiving device; and
based on the determination whether the transmitting device will be prevented from transmitting the one or more uplink messages, determine whether to transmit a polling or scheduling message to the transmitting device, wherein the polling or scheduling message schedules resources in which to transmit one or more uplink messages from the transmitting device.

25. The receiving device of claim 24, wherein the instructions are such that the receiving device is operative to:
perform carrier-sensing to detect a level of wireless activity on one or more second channels configured for transmissions by the receiving device, and
wherein the receiving device is further caused to determine whether to transmit a polling or scheduling message to a transmitting device of the one or more transmitting devices is further based on an outcome of the carrier-sensing.

26. The receiving device of claim 24:
wherein the instructions are such that the receiving device is operative to determine, based on the information indicative of the level of wireless activity experienced by the one or more transmitting devices on the one or more first channels, whether the one or more transmitting devices will be prevented from transmitting one or more uplink messages to the receiving device owing to a carrier-sense failure; and
wherein the determination whether to transmit the polling or scheduling message to the transmitting device is based on the determination whether the transmitting device will be prevented from transmitting the one or more uplink messages.

27. The receiving device of claim 24, wherein the instructions are such that the receiving device is operative to determine whether the one or more transmitting devices will be prevented from transmitting by determining the one or more transmitting devices will be prevented from transmitting one or more uplink messages to the receiving device owing to a carrier-sense failure.

28. The receiving device of claim 24, wherein the information comprises an indication of the geographical location of the one or more interfering devices.

* * * * *